United States Patent
Frank

(10) Patent No.: US 6,925,871 B2
(45) Date of Patent: Aug. 9, 2005

(54) LEVEL SENSORS

(75) Inventor: Peter Frank, London (GB)

(73) Assignee: Product Innovation Holdings Ltd. (GB)

( * ) Notice: Subject to any disclaimer, the term of this patent is extended or adjusted under 35 U.S.C. 154(b) by 0 days.

(21) Appl. No.: 10/619,868

(22) Filed: Jul. 15, 2003

(65) Prior Publication Data

US 2004/0089067 A1 May 13, 2004

(30) Foreign Application Priority Data

Jul. 15, 2002 (EP) .............................................. 02254951

(51) Int. Cl.$^7$ .......................... G01F 23/28; G01N 21/49
(52) U.S. Cl. .................... 73/293; 250/577; 250/900; 116/227
(58) Field of Search ............................ 73/293; 250/577, 250/227.25, 227.11, 900, 901, 902, 903; 116/227

(56) References Cited

U.S. PATENT DOCUMENTS

| | | | |
|---|---|---|---|
| 3,648,521 A | 3/1972 | Amendolia et al. | |
| 4,051,726 A | 10/1977 | Hastbacka et al. | |
| 4,119,860 A | * 10/1978 | Gooley | ................... 250/577 |
| 4,353,252 A | 10/1982 | Jeans et al. | |
| 4,956,560 A | 9/1990 | Smith et al. | |
| 5,274,245 A | * 12/1993 | Lee | ........................ 250/577 |
| 5,824,916 A | 10/1998 | Posner et al. | |
| 6,307,198 B1 | * 10/2001 | Asakura et al. | ....... 250/227.25 |
| 6,744,371 B1 | * 6/2004 | Schmitt et al. | ........... 340/602 |

FOREIGN PATENT DOCUMENTS

| | | |
|---|---|---|
| EP | 0180357 | 5/1986 |
| EP | 0952432 | 10/1999 |
| FR | 2791131 | 9/2000 |
| GB | 2029005 | 3/1980 |
| GB | 2036326 | 6/1980 |

OTHER PUBLICATIONS

Derwent abstract, SU-1372189-A, Feb. 1988.*

* cited by examiner

Primary Examiner—Michael Cygan
(74) Attorney, Agent, or Firm—Andrus, Sceales, Starke & Sewall, LLP

(57) ABSTRACT

A level detector comprises an array of light emitting devices mounted in a line parallel to an array of light receiving devices, the arrays being mounted within a housing capable of internally reflecting light from the emitting devices to respective receiving devices unless the respective parts of the level sensor are immersed in liquid. The outer internally-reflecting surface of the housing is preferable a continuous straight-line surface along the direction parallel to the arrays.

12 Claims, 2 Drawing Sheets

LEVEL SENSORS

CROSS REFERENCE TO RELATED APPLICATION

This application claims priority from European Patent Application No. 02254951.3, filed Jul. 15, 2002.

FIELD OF THE INVENTION

This invention relates to a method and apparatus for measuring liquid levels.

BACKGROUND OF THE INVENTION

Many different types of level sensors are available, and these rely upon a variety of different physical principles. One reason for the large variety of sensors is that level sensors are required in numerous different environments for many different purposes, and few level sensors are versatile enough to have a wide range of use. Thus, for example, some level sensors merely detect whether or not liquid has exceeded a predetermined level, whereas some applications require measurement of liquid level throughout a range. Some level sensors operate over an inadequate range, and others with inadequate resolution. Sensors which operate accurately over a predetermined range can be excessively expensive, particularly for wider ranges. In some cases, the structure or physical principles of operation are incompatible with the environment in which the sensor is intended to be used.

Some known forms of liquid level sensor are level switches which operate using optical principles. For example, the sensor may be a transparent device which incorporates a light emitter and a light receiver so arranged that light from the emitter is totally internally reflected by the outer wall of the device to the receiver when the sensor is surrounded by air. However, when immersed in liquid, the light from the receiver is refracted into the liquid, so the light received by the receiver diminishes, thus providing an output indicative of the immersion. See for example GB 2 036 326 A.

Such arrangements are not, however, suitable for indicating varying liquid levels. It would of course be possible to provide a number of such level switches spaced in a vertical direction in order to provide for a varying level indication. However, this would be expensive and difficult to assemble. The physical size of each switch would preclude the possibility of mounting them in close proximity, thus resulting in an arrangement which is lacking in resolution and/or compactness.

It would be desirable at least to mitigate the problems referred to above.

DESCRIPTION OF THE INVENTION

Aspects of the present invention are set out in the accompanying claims.

According to a further aspect of the invention, a level sensor incorporates an array of light emitters arranged along a direction which, in use, is at least approximately vertical, and an array of light receivers distributed along a substantially parallel direction, each receiver being operable to receive light from at least one emitter. The emitter and receiver arrays have a common transparent housing which is capable of totally internally reflecting light from the emitters to the receivers by an external surface which is preferably continuous and straight in the aforementioned direction.

Such an arrangement provides for ease of manufacture, especially if the housing is formed using a moulding, extrusion or potting process. An inexpensive unitary device provides for detection of various different levels. Using a continuous, preferably straight external surface means that the positions of the emitters and receivers with respect to the length of the housing are not critical, and also facilitates cleaning of the sensor, which can be very important in certain environments, such as those involving foodstuffs. These advantages are further enhanced if, in accordance with a preferred aspect of the invention, the outside profile of the housing is substantially uniform throughout the length over which level sensing takes place.

Varying liquid levels can be determined by operating the light emitters (preferably at respective different time intervals), and determining which receivers receive a significant amount of light (indicating that the housing close to receivers is not immersed in liquid), and which receive a diminished amount of light (indicating that light is being refracted out of the housing by liquid in the region near the receiver).

Further preferred features of the invention enable additional cost reduction and ease of manufacture.

According to one preferred feature, the emitters and receivers are respectively driven and enabled by at least one shift register. Use of a shift register (which can be implemented using very inexpensive components) reduces the wiring requirements of the circuit as compared with providing individual driving and enabling circuits. There may be respective shift registers for the emitters on the one hand and the receivers on the other hand. However, the preferred embodiment incorporates a shift register which both drives the emitters and enables the receivers.

According to a further preferred feature of the invention, the circuit for operating the level sensor comprises a plurality of individual circuit boards of identical, modular construction, each circuit board containing a portion of the shift register. This means that level sensors of differing lengths can be built using common components, by appropriate selection of the number of modular circuit boards, thus reducing costs.

According to a further preferred feature of the invention, each receiver is operable to receive light from at least two emitters at respective different heights, the emitters being, in use, operated at different time intervals. Thus, a single receiver can indicate whether or not the liquid has reached any of two different levels. Additionally, or alternatively, each emitter is arranged to illuminate two separate receivers, each of which can be enabled in respective different periods. Accordingly, a single emitter can be used for determining whether the liquid has reached either of two different levels. By combining these features, for a given resolution, the number of emitters and receivers can be halved, thus further reducing costs.

In a still further preferred feature of the invention, the circuit for operating the level sensor is arranged to determine not only whether the liquid has reached certain discrete levels corresponding to respective emitter/receiver light paths, but also whether the liquid has reached one or more intermediate levels, in accordance with the amount by which the light received by a receiver has diminished due to refraction of some of the light into the liquid due to partial immersion of the adjacent sensor region. For a given number of emitters and receivers, this can at least double the resolution of the sensor.

According to a still further preferred feature of the invention, the level sensor incorporates a memory storing calibration data which is used in order to determine whether the amount of light received by a receiver indicates that the respective location on the level sensor is or is not immersed. This therefore compensates for manufacturing variations which can cause respective light emitters to emit different amounts of light. The receivers may also have different sensitivities, which can be compensated by the calibration data. There may be individual calibration data values for the respective emitters and/or for the respective receivers, but in the preferred embodiment, there are stored respective calibration data for the different emitter/receiver light paths.

According to a further preferred feature of the invention, the effects of ambient light are compensated when evaluating the outputs of the light receivers by taking a separate ambient light measurement. In the preferred embodiment, each reading from an emitter/receiver pair is compensated by a separate reading from the same receiver without the respective emitter being operated; that is, individual ambient readings are taken for the different receivers. In a particularly preferred embodiment, the ambient reading is combined with the calibration data mentioned above in order to compensate both for individual variations in circuit components and ambient light.

According to a still further feature of the invention, the influence of temperature is also compensated. This is especially valuable in arrangements in which intermediate levels can be detected by virtue of the amount of light received by the receivers, which operation can be significantly influenced by temperature. Preferably, temperature compensation is carried out by taking readings from an emitter/receiver pair in a known state (preferably non-immersed) and comparing these readings with calibration data for the corresponding devices to derive a temperature compensation factor.

DESCRIPTION OF THE DRAWINGS

Arrangements embodying the invention will now be described by way of example with reference to the accompanying drawings, in which.

DETAILED DESCRIPTION OF PREFERRED EMBODIMENTS

Figure 1:
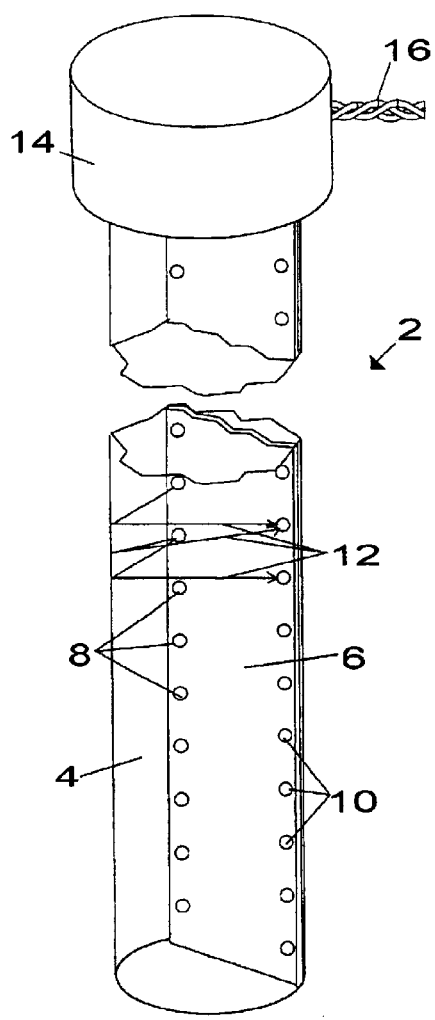
FIG. 1 is a perspective view, partially broken away, of a level sensor in accordance with the invention.

Referring to FIG. 1, a level sensor 2 comprises an elongate housing 4 intended to be mounted in a vessel in a generally upright orientation. The housing contains one or more circuit boards 6 carrying an array 8 of light emitters and an array 10 of light receivers. The elements of each array are spaced apart in the direction of length of the sensor 2. Each of the light emitters 8 is positioned intermediate the height of an adjacent pair of receivers 10.

The housing 4 is formed by insert moulding around the circuit board 6 and comprises a transparent material, for example an acrylic material.

The light emitters 8 may comprise surface-mounted infrared emitting LEDs. The light receivers 10 may comprise surface-mounted phototransmitters responsive to infra-red light. (The term "light" is intended herein not to be restricted merely to visible light, but also to extend to all other wavelengths of electromagnetic radiation, and other terms, such as "transparent" should be interpreted accordingly.)

The refractive index of the housing 4, which may be similar to the refractive indices of the plastic housings of the emitters 8 and receivers 10, is significantly different from the refractive indices of the liquids with which it is intended to be used. The refractive index and the positions of the emitters 8 and receivers 10 are such that each receiver can receive light which has been emitted from either one of two adjacent emitters 8 and then internally refracted by the outer surface of the housing 4. Similarly, each emitter can illuminate two adjacent receivers 10 by means of light which has been internally reflected. Examples of such light paths are shown at 12. It will be noted that the light paths are in respective different non-parallel planes.

The circuit board 6 also carries electrical components (not shown in FIG. 1), and principally a shift register for driving the emitters 8 and enabling the receivers 10. The components are connected to a control circuit housed within a cap 14 at the top of the sensor, which receives power and sends an output signal via wires 16.

Figure 2:
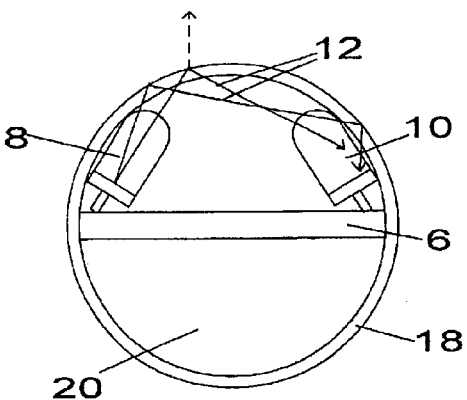
FIG. 2 is a cross section through a modified version of the sensor of FIG. 1.

FIG. 2 is a cross section through a modified arrangement, in which the housing 4 comprises an outer cylindrical wall 18, for example made of a PVC or polycarbonate extrusion, in which the circuit board 6 is mounted. Following this operation, the housing 4 is filled with a potting compound 20, for example a clear two-part epoxy, of similar refractive index to the transparent wall 18. In this embodiment, the surface-mounted emitters 8 and receivers 10 have been replaced by through-hole components which are angled towards each other so as to increase the angle of incidence of the light emitted thereby to the normal to the wall 18, thereby increasing total internal reflection of the light.

In both embodiments, the emitters 8 and receivers 10 are spaced apart as far as possible in order to increase this angle of incidence. For this reason, in the embodiment of FIG. 2, the thickness of the wall 18 is preferably relatively small.

The embodiment of FIG. 2 may be easier to manufacture, particularly if the level sensor is intended to be used in fairly hostile environments, in which case the cylindrical wall 18 can be made of protective material.

Figure 3:
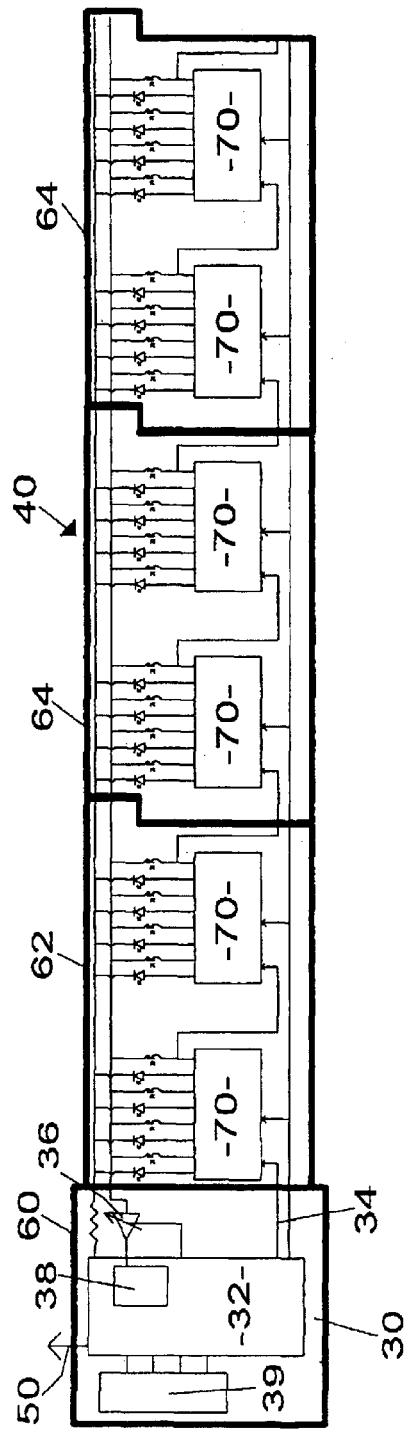
FIG. 3 shows the circuit of the level sensor.
Figure 4:
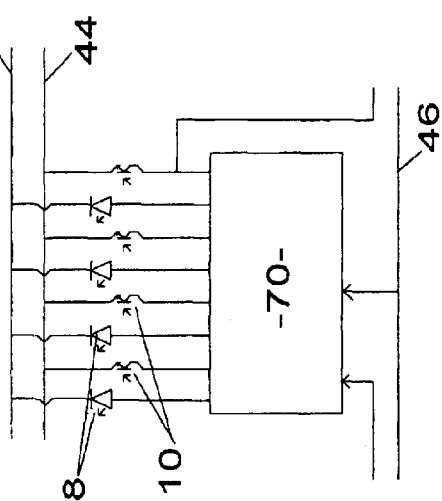
FIG. 4 shows part of a shift register of the circuit of FIG. 3.

Referring to FIG. 3, the circuit of the level sensor 2 comprises principally a control circuit 30 and a shift register 40. The shift register 40 comprises a plurality of substantially identical sections, one of which is shown in FIG. 4. Each section receives as its input the output from the last stage of the preceding section. Each emitter 8 is connected between a respective shift register output and a common supply voltage rail 42. Each receiver 10 is coupled between a respective shift register output and a common output rail 44. The emitters 8 and receivers 10 are coupled to respective alternate outputs of the shift register 40.

The control circuit 30 comprises a microprocessor 32 which has a clock output which clocks the respective shift register sections via a common clock rail 46. The microprocessor also has an output line 34 which transmit data serially into the input of the first shift register section. By producing clock pulses on the line 46, any data sent to the first stage of the shift register is gradually clocked along the shift register, thus selectively driving the successive emitters 8 and enabling the successive receivers 10. When one of the receivers 10 is enabled, an output signal representative of the degree of illumination of the receiver is provided on output rail 44 to a variable gain element 36, whose gain is controlled by the microprocessor 32, and then to an analog-to-digital converter 38 forming part of the microprocessor 32.

The microprocessor 32 is also coupled to a non-volatile memory 39, such as an EPROM, which stores calibration data. The microprocessor provides output data serially on an output line 50 indicative of a liquid level detected by the sensor 2. This can for example be sent to a digital display, a voltage (digital-to-analog) converter or a 4–20 mA drive converter.

The operation of the level sensor will now be described, starting with an explanation of individual elementary operations. It is assumed that the devices 8 and 10 are collectively referred to by indices i, ranging from device 1 connected to the first shift register output to the last device n. Each light path has an index corresponding to the lowest index of the two devices defining the path.

Ambient Reading Operation

Assuming that the $i^{th}$ device is a receiver and an ambient reading is required for this device, the microprocessor 32 sends a binary value "1" followed by zeroes to the shift register 40, and issues i clock pulses to cause the "1" to travel to the $i^{th}$ device. After a brief settling interval, the microprocessor then reads the value appearing at the output of the analog-to-digital converter 38. This ambient reading will be referred to as $AR_i$.

Light Path Reading

Assuming that a reading is taken of the $i^{th}$ light path between the $i^{th}$ device and the $(i+1)^{th}$ device, the microprocessor transmit the binary value "11" followed by zeroes to the shift register 40 and i clock pulses so that these digits reach the appropriate devices. After a brief settling time, the microprocessor reads the value of the analog-to-digital converter 38. Its value will be referred to as a light path reading $LP_i$.

Compensated Reading Operation

In order to derive a sensor reading which is compensated for ambient light, there is derived a compensated reading $CR_i$ which is the difference between the light path reading and the ambient reading, i.e. $CR_i = LP_i - AR_i$.

Preferably, each compensated reading is derived by two immediately successive operations, one involving taking the ambient reading and the other involving taking the light path reading, so as to avoid the need to store these individual measurements.

Calibration Operation

After manufacture of the level sensor 2, but before sale, a calibration operation is performed in order to derive the calibration data stored in the memory 39. This involves deriving compensated readings $CR_i$ for all adjacent emitter/receiver pairs while the level sensor is not submerged, to obtain upper calibration readings $UC_i$, and then repeating the operation when the level sensor is submerged to derive lower calibration readings $LC_i$. Thus, for each emitter/receiver path there is stored within the memory 39 two calibration data values.

As an alternative, the calibration operation can be carried out in the dark, and each calibration value set equal to the light path reading $LP_i$, rather than the compensated reading $CR_i$.

Immersion Decision Operation

In use of the level sensor, a determination of whether the light sensor is immersed at a region adjacent the $i^{th}$ light path between the $i^{th}$ device and the $(i+1)i^{th}$ device, is made by obtaining the compensated reading $CR_i$ and then determining whether:

$$CR_i < (UC_i - LC_i)/TH,$$

where TH is a predetermined threshold quantity, e.g. 8. If the condition is met, i.e. little light is being received, then the relevant part of the level sensor is determined to be immersed. If the portion is immersed, then a variable $I_i$ is equal to 1, otherwise $I_i$ equals 0.

Coarse Level Determination

The coarse level is evaluated by carrying out immersion decision operations at different levels i, and determining the minimum value k for which $I_k=1$ and $I_{k+1}=1$. That is, the coarse level LC corresponds to the highest level k for which both that level and the immediately adjacent lower level are submerged. Checking that both of two adjacent levels are immersed avoids possible errors due to drips on the side of the level sensor above the liquid level. In a modification, additional lower levels could be checked if desired.

If the approximate level is known, for example from a former reading, then the new level can be determined by a search operation starting with the expected level and then checking alternately higher and lower levels, gradually extending away from the expected level, until the required conditions are met. If the level is completely unknown, a binary search procedure can be used.

Dirt Measurement

After the coarse level is determined, a compensated reading is derived for the light path two levels above the coarse level, i.e. the reading $CR_{k-2}$ is determined. (This is assumed to be a reading at a location where there is no liquid adjacent the level sensor. This can be checked by determining $I_{k-2}$, and a different level selected if the assumption is incorrect.) This is then compared with the upper calibration reading $UC_{k-2}$. If $$UC_{k-2} - CR_{k-2} > TD,$$

where TD is a predetermined threshold, this indicates that the reading is significantly lower than expected, taking into account the ambient light, suggesting the presence of too much dirt on the sensor. The control circuit then issues a warning signal (which could trigger an audible or visual alarm). If desired, this check could be performed for additional non-immersed light paths.

Fine Level Determination Operation

Assuming no significant amount of dirt is found, a temperature compensation factor TC is then derived by performing the calculation:

$$TC = (CR_{k-2} - LC_{k-2})/(UC_{k-2} - LC_{k-2}).$$

This temperature compensation factor thus represents the ratio between the actual range between the readings for the sensor when not submerged and when submerged, and the calibrated range. (The reading when submerged is normally low and assumed to be equal to the calibration reading $LC_{k-2}$.)

It is assumed that this ratio will be substantially constant for other positions on the level sensor, at least those closely adjacent the (k−2) light path.

Having determined that the k level is totally immersed, and the (k−2) level is not immersed, the extent of immersion of the (k−1) level is then determined. A temperature compensated reading $TR_{k-1}$ is calculated as follows:

$$TR_{k-1} = CR_{k-1}/TC.$$

The level sensor adjacent the (k−1) light path is then determined to be not immersed if:

$$TR_{k-1} > 3(UC_{k-1} - LC_{k-1})/4,$$

or semi-immersed if:

$$(UC_{k-1} - LC_{k-1})/4 <= TR_{k-1} <= 3(UC_{k-1} - LC_{k-1})/4,$$

or fully immersed if:

$$TR_{k-1} < (UC_{k-1} - LC_{k-1})/4.$$

Accordingly, it is possible to derive a fine level reading which, depending upon its determination, corresponds to the coarse reading k, the next level up, k−1 or an intermediate position between these two levels. With an appropriate construction and by using more intermediate threshold levels, a greater resolution could be achieved. It is however, noted that this fine level reading is optional, and could be omitted if the response characteristics of the devices are unsuitable, of if this precision is not required.

Variable Gain

If desired, prior to taking a set of readings in order to calculate a level measurement, the microprocessor 32 may be arranged to adjust the gain of the variable gain element 36. This could be achieved by obtaining a compensated reading $CR_i$ from one or more illuminated receivers and altering the gain in order to get a substantial reading. This enables the device to avoid analog-to-digital resolution errors by operating at an appropriate gain.

Circuit Structure

Referring again to FIG. 4, the circuit of the level sensor is mounted on a plurality of circuit boards. The control circuit 30 is mounted on a first circuit board 60 housed in the cap 14 of FIG. 1. The first two sections of the shift register 40 are mounted on a circuit board 62. Subsequent pairs of sections are mounted on circuit boards 64 of identical construction. To form level sensors of different lengths, fewer or more circuit boards 64 can be used. In this embodiment, each section of the shift register comprises a single integrated circuit 70 (for example part number 74HC164), and each circuit board 64 carries two such integrated circuits. However, the circuit boards could incorporate fewer or more sections or integrated circuits.

If desired, the final receiver 10' of the array may be replaced by a resistor of predetermined value, so that the microprocessor 32 can sense when the last stage of the shift register has been reached. This will enable the microprocessor to operate using software which is common for differentlength level sensors.

Modifications

Figure 5:
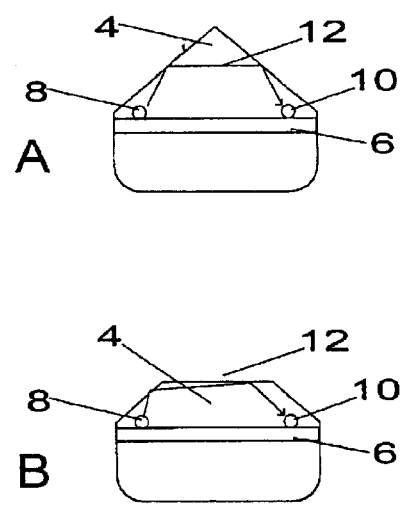
FIGS. 5A and 5B illustrate the cross-sections of other modified embodiments and possible light paths therein.

Various modifications are possible. It is preferred for the level sensor housing to be circular in cross section, as shown in FIG. 2, as this readily permits the divergent beam from the emitter to travel to the receiver by multiple paths involving total internal reflection. Other shapes are possible, however. The cross section may be elliptical or part-elliptical, or could be trapezoidal, for example as shown in FIGS. 5a and 5b. The profile of the cross-section is preferably substantially uniform along the length throughout which the emitters and receivers are distributed. Temperature compensation can be achieved by other means than those set out above, e.g. by thermistors in series with the emitters. To reduce the effects of ambient light, the housing or the potting-compound is preferably formed of material which is transparent to the wavelength (e.g. infra-red) used by the emitters and receivers but substantially opaque to other wavelengths.

What is claimed is:

1. A level detector comprising:

a transparent housing;

a plurality of light emitting devices in the housing arranged along a direction which is substantially upright in use of the detector; and a plurality of light receiving devices in the housing and also arranged along said direction, each light receiving device being operable to receive light via first and second light paths from first and second adjacent light emitting devices if the light is internally reflected by the housing, which depends on the refractive index of the fluid surrounding the housing; and a circuit coupled to the light emitting devices and the light receiving devices and arranged such that for each light receiving device, the circuit can recognize and differentiate between light received via the first light path only, the second light path only, and both the first and second light paths;

whereby the extent of immersion of the level detector within a liquid can be determined by said circuit.

2. A level detector comprising:

a transparent housing;

a plurality of light emitting devices in the housing arranged along a direction which is substantially upright in use of the detector; and a plurality of light receiving devices in the housing and also arranged along said direction, each light emitting device being operable to illuminate, via first and second light paths, each of first and second adjacent light receiving devices if the light is internally reflected by the housing, which depends on the refractive index of the fluid surrounding the housing; and a circuit coupled to the light emitting devices and the light receiving devices and arranged such that for each light emitting device, the circuit can recognize and differentiate between light received from each light emitting device via the first light path only, the second light path only, and both the first and second light paths;

whereby the extent of immersion of the level detector within a liquid can be determined by said circuit.

3. A level detector as claimed in claim 2, wherein each light receiving device can receive light via respective light paths from each of two adjacent light emitting devices if the light is internally reflected by the housing, and wherein said circuit can determine whether light is received via each light path to each light receiving device.

4. The level detector of claim 1, wherein said control circuit is for deriving a reading from a first light receiving device, the reading being dependent upon the relationship between an ambient measurement taken when no light emitting device is operating and an operational measurement taken when a light emitting device capable of illuminating the first light receiving device is operating.

5. A level detector as claimed in claim 4, wherein said control circuit comprises a memory storing calibration data, the calibration data comprising values associated with respective light emitting devices and/or light receiving devices and/or light paths between emitting and receiving devices, and means operable to determine whether respective parts of the level sensor are immersed in dependence upon the outputs from the emitters and associated calibration data.

6. A level detector as claimed in claim 5, wherein the calibration data comprises at least one value for each light path and associated emitting device and receiving device.

7. A level detector as claimed in claim 5, the control circuit being operable to determine, using calibration data, an ambient reading and an operational reading, whether a respective part of a level sensor is one of at least (a) fully immersed, (b) partially immersed or (c) not immersed in the liquid.

8. A level detector as claimed in claim 1, wherein said circuit is operable to perform a search procedure involving checking whether an intermediate level is immersed and then checking alternately higher and lower levels, locating the highest sensor whose output indicates immersion and checking that at least one lower sensor also has an output indicating immersion.

9. A level detector as claimed in claim 1, wherein the housing has an internally-reflecting surface which is substantially continuous and straight along said direction.

10. A level detector as claimed in claim 9, wherein the outer profile of the housing, when considered transverse to said direction, is substantially uniform throughout the distance over which level sensing takes place.

11. A level detector comprising:

a transparent housing;

a plurality of light emitting devices in the housing arranged along a direction which is substantially upright in use of the detector;

a plurality of light receiving devices in the housing and also arranged along said direction, each light receiving device being operable to receive light from at least one light emitting device which has been internally reflected by the housing in dependence on the refractive index of the fluid surrounding the housing;

whereby the extent of immersion of the level detector within a liquid can be determined from the outputs of the light receiving devices; and a control circuit for deriving a reading from a light receiving device, the reading being dependent upon the relationship between an ambient measurement taken when no light emitting device capable of illuminating the light receiving device is operating and an operational measurement taken when a light emitting device capable of illuminating the light receiving device is operating;

wherein said control circuit comprises a memory storing calibration data, the calibration data comprising values associated with respective light emitting devices and/or light receiving devices and/or light paths between emitting and receiving devices, and means operable to determine whether respective parts of the level sensor are immersed in dependence upon the outputs from the emitters and associated calibration data;

the control circuit being operable to determine, using calibration data, an ambient reading and an operational reading, whether a respective part of a level sensor is dirty.

12. A level detector comprising:

a transparent housing;

a plurality of light emitting devices in the housing arranged along a direction which is substantially upright in use of the detector;

a plurality of light receiving devices in the housing and also arranged along said direction, each light receiving device being operable to receive light from at least one light emitting device which has been internally reflected by the housing in dependence on the refractive index of the fluid surrounding the housing;

whereby the extent of immersion of the level detector within a liquid can be determined from the outputs of the light receiving devices; and a control circuit for deriving a reading from a light receiving device, the reading being dependent upon the relationship between an ambient measurement taken when no light emitting device capable of illuminating the light receiving device is operating and an operational measurement taken when a light emitting device capable of illuminating the light receiving device is operating;

wherein said control circuit comprises a memory storing calibration data, the calibration data comprising values associated with respective light emitting devices and/or light receiving devices and/or light paths between emitting and receiving devices, and means operable to determine whether respective parts of the level sensor are immersed in dependence upon the outputs from the emitters and associated calibration data;

the control circuit being operable to determine, using calibration data, an ambient reading and an operational reading, whether a respective part of a level sensor is one of at least (a) fully immersed, (b) partially immersed or (c) not immersed in the liquid; and the control circuit being operable to determine, using calibration data, an ambient reading and an operational reading, whether a respective part of a level sensor is dirty.

* * * * *